United States Patent [19]

Maki et al.

[11] Patent Number: 5,171,479
[45] Date of Patent: Dec. 15, 1992

[54] ANTISTATIC AND IONICALLY CONDUCTIVE RESIN COMPOSITION

[75] Inventors: Hirohisa Maki, Shiga; Takeshi Fujita; Katsuaki Matsuo, both of Kyoto, all of Japan

[73] Assignee: Dai-Ichi Kogyo Seiyaku Co., Ltd., Kyoto, Japan

[21] Appl. No.: 691,651

[22] Filed: Apr. 25, 1991

[30] Foreign Application Priority Data

Apr. 27, 1990 [JP] Japan .................................. 2-112220

[51] Int. Cl.⁵ .............................................. H01B 1/22
[52] U.S. Cl. .................................... 252/511; 252/502; 252/513; 252/514
[58] Field of Search ............... 252/511, 512, 513, 514, 252/518, 519, 502; 524/495, 496, 439, 440, 401, 378, 379; 523/457–459, 468, 455, 456, 511, 512

[56] References Cited

U.S. PATENT DOCUMENTS

| | | | |
|---|---|---|---|
| 4,510,079 | 4/1985 | Kawai et al. | 252/511 |
| 4,525,297 | 6/1985 | Yamane et al. | 252/511 |
| 4,678,602 | 7/1987 | Tanaka et al. | 252/512 |
| 4,731,199 | 3/1988 | Matsuo et al. | 252/518 |
| 4,780,247 | 10/1988 | Yasuda | 252/511 |
| 4,909,960 | 3/1990 | Watanabe et al. | 524/495 |

FOREIGN PATENT DOCUMENTS 60-90253  5/1985  Japan .
1-26674   1/1989  Japan .

*Primary Examiner*—William R. Dixon, Jr.
*Assistant Examiner*—Chris Gallo
*Attorney, Agent, or Firm*—Jordan and Hamburg

[57] ABSTRACT

An antistatic and ionically conductive resin composition comprises:

(A) 100 parts by weight of a resin,
(B) 0.1 to 70 parts by weight of a high-molecular compound having an average molecular weight of not less than 10,000 prepared by reacting a polyoxyalkylene glycol with at least one of the polycarboxylic acids, polycarboxylic acid lower alkyl esters, polycarboxylic acid anhydrides and organic polyisocyanates, and
(C) 0.1 to 30 parts by weight of an electrically conductive filler.

6 Claims, No Drawings

ANTISTATIC AND IONICALLY CONDUCTIVE RESIN COMPOSITION

BACKGROUND OF THE INVENTION

1. Technical Field

The present invention relates to an antistatic (static-inhibited) and ionically conductive resin composition.

2. Prior Art

Resin in general is an electric insulator because of its high surface resistance and volume resistivity but the very characteristics favor generation of static electricity to charge its surface.

This generation of surface charge, in turn, favors deposition of dust on resin products to adversely affect their appearance and quality and may cause a disastrous explosion. For this reason, a variety of techniques have been proposed for imparting antistaticity to resin. For example, the technique is known which comprises coating a resin product with a surfactant or an ionically conductive material.

However, the antistaticity imparted by such technique tends to disappear or be attenuated upon frictional contact with or cleaning of the resin surface.

It is further known to incorporate into resin compositions an electrically conductive material, such as a metal powder, a metal fiber or carbon black, for shielding from electromagnetic waves or removing static electricity. However, for a resin composition to acquire electrical conductivity as a result of contact of electrically conductive particles contained therein with one another, it is necessary to add such particles in large amounts. As a result, one or more of the characteristics of the resin may be sacrificed, pinholes may be formed on the molded resin surface, the specific gravity of the resin composition may be increased, and/or the shock or impact resistance may be decreased.

SUMMARY OF THE INVENTION

Accordingly, it is an object of the present invention to solve the above-mentioned problems by incorporation of a specific high-molecular compound, which is defined herein, and an electrically conductive filler each in a small proportion and thus provide an antistatic and ionically conductive resin composition capable of giving resin products with adequate antistaticity and ionic conductivity.

The present invention is, therefore, directed to an antistatic and ionically conductive resin composition comprising:
 (A) 100 parts by weight of a resin,
 (B) 0.1 to 70 parts by weight of a high-molecular compound with an average molecular weight of not less than 10,000 as produced by reacting a polyoxyalkylene glycol with at least one member of the group consisting of polycarboxylic acids, polycarboxylic acid lower alkyl esters, polycarboxylic acid anhydrides and organic polyisocyanates, and
 (C) 0.1 to 30 parts by weight of an electrically conductive filler.

The term "average molecular weight" is used herein to mean "weight average molecular weight".

One of the constituents of said high-molecular compound to be used in the resin composition of the present invention is a polyoxyalkylene glycol (hereinafter referred to briefly as POAG) having an average molecular weight of preferably not less than 100.

This compound can be prepared by addition-polymerizing an alkylene oxide with an organic compound containing two active hydrogen atoms.

The active hydrogen atoms mentioned just above include those of alcoholic hydroxy groups, amino groups, phenolic hydroxy groups and so on.

Examples of such organic compound containing two active hydrogen atoms are ethylene glycol, diethylene glycol, propylene glycol, dipropylene glycol, 1,4-butanediol, 1,6-hexanediol, neopentyl glycol, bisphenol A, polyethylene glycol, polypropylene glycol, polytetramethylene glycol, butylamine, octylamine, laurylamine, cyclohexylamine and so on. The alkylene oxide to be addition-polymerized is, for example, ethylene oxide, propylene oxide, butylene oxide, styrene oxide or the like.

This addition polymerization is carried out in the presence of a catalyst, which is preferably a base, such as sodium hydroxide or potassium hydroxide, or an acid, such as boron trifluoride, at a temperature of about 90° to 200° C. for about 2 to 30 hours.

Where the average molecular weight of the resulting POAG is less than 100, the inhibition of static electricity and/or the ionic conductivity is not satisfactory.

The polycarboxylic acid, a lower alkyl ester thereof or an anhydride thereof which is to be reacted with POAG includes, among others:
 (a) malonic acid, succinic acid, maleic acid, fumaric acid, adipic acid, sebacic acid, phthalic acid, isophthalic acid, terephthalic acid, itaconic acid, trimellitic acid, pyromellitic acid and dimer acid, etc.;
 (b) the corresponding monomethyl ester, dimethyl ester, monoethyl ester, diethyl ester, monopropyl ester, dipropyl ester, monobutyl ester, dibutyl ester, etc.: and
 (c) anhydrides of the acids mentioned in (a).

The organic polyisocyanate to be reacted with said POAG includes, among others, tolylene diisocyanate, 4,4'-methylenebis(phenyl isocyanate), hexamethylene diisocyanate, isophorone diisocyanate, xylylene diisocyanate, 4,4'-methylenebis(cyclohexyl isocyanate), 4,4'-isopropylidenebis(cyclohexyl isocyanate), trimethylhexamethylene diisocyanate and so on.

Reacting said POAG with such a polycarboxylic acid, lower alkyl ester or anhydride or such an organic polyisocyanate gives rise to the high-molecular compound for the present invention.

For example, the reaction of said POAG with said polycarboxylic acid, lower alkyl ester or anhydride is carried out in a functional group ratio of 1:2 to 2:1 in the manner of esterification or trans-esterification at a temperature of 120°-250° C. and a pressure of $10^{-4}$ to 10 torr.

The reaction between said POAG and organic polyisocyanate is carried out in an NCO/OH equivalent ratio of 1.5 to 0.5 at a temperature of 80° to 150° C. for 1 to 5 hours, for instance.

The average molecular weight of said high-molecular compound is preferably not less than 10,000. If the molecular weight is less than 10,000, the compound tends to bleed out on the resin surface to make it sticky.

The electrically conductive filler to be used in the resin composition of the invention includes, among others, powders, fine powders, flakes, whiskers and fibers derived from metals, such as gold, silver, nickel, iron, aluminum and zinc, and from oxides of such metals as well as carbonaceous powders, granules and fibers, such as acetylene black, furnace black, graphite and carbon fibers.

There is no particular limitation on the kind of resin which can be employed for the purposes of the invention. Thus, for example, there may be mentioned various thermoplastic resins such as polyethylene, polypropylene, ethylene-propylene copolymer, polyvinyl chloride, ethylene-vinyl chloride copolymer, polystyrene, styrene-butadiene copolymer, polymethyl methacrylate, acrylonitrile-butadiene-styrene terpolymer, polyalkylene phthalate and other saturated polyesters polyamide, polycarbonate, polyurethane, polyacetal, polyphenylene oxide, fluororesin, etc. and a variety of thermosetting or thermally infusible resins such as urea resin, melamine resin, unsaturated polyester resin, epoxy resin, polyurethane resin, phenolic resin, silicone resin and so on.

The antistatic and ionically conductive resin composition of the present invention contains 0.1 to 70 parts by weight, preferably 0.5 to 30 parts by weight, of the high-molecular compound and 0.1 to 30 parts by weight, preferably 0.5 to 20 parts by weight, of the electrically conductive filler per 100 parts by weight of resin.

If the proportion of the high-molecular compound is less than 0.1 part by weight, the antistaticity or ionic conductivity of the resin composition will not be adequate, while the use of the high-molecular compound in excess of 70 parts by weight tends to sacrifice the mechanical strength of the resin. In case the proportion of the electrically conductive filler is less than 0.1 part by weight, the antistatic effect will not be sufficient, while the use of the filler in excess of 30 parts by weight will lead to a decreased mechanical strength of the resin composition.

To manufacture the resin composition of the invention, the high-molecular compound can be kneaded into the resin together with the electrically conductive filler or first kneaded into the resin. In the latter case, the resulting blend is then further kneaded with the electrically conductive filler.

The resin composition of the invention may contain such additives as a plasticizer, lubricant, stabilizer, colorant, filler and so on.

There is no limitation on the configuration of products that can be molded from the resin composition of the invention. For example, the products may be those which can be manufactured by such techniques as compression molding, injection molding, extrusion molding, blow molding, etc., inclusive of films, sheets, filaments, pellets, powders and so on.

While it is generally subjected to molding as such in the form of a homogeneous mixture, the resin composition containing the high-molecular compound and electrically conductive filler may be made into a film or sheet for lamination to an ordinary resin film or the like.

While ordinary synthetic resin generally has a surface resistivity of not less than $10^{14}$ Ω·cm and therefore has high staticity, the resin composition of the invention has a surface resistivity of only $10^{11}$ Ω·cm or less and, therefore, has marked antistaticity and ionic conductivity. Furthermore, these characteristics are sustained without attenuation for a long period of time.

Furthermore, the resin composition of the invention is not different from the substrate resin in appearance and basic characteristics and can be similarly molded.

Thus, in accordance with the present invention, it is now possible, by incorporation of the high-molecular compound and electrically conductive filler each in a small proportion, to provide a resin composition capable of insuring adequate antistaticity and ionic conductivity, thus contributing remarkably to the related industries and the users.

DETAILED DESCRIPTION OF THE PREFERRED EMBODIMENTS

The following examples and comparative examples are intended to further illustrate various modes of embodiment and effects of the invention and should by no means be construed as limiting the scope of the invention.

EXAMPLE 1

A vacuum kneader was charged with 100 parts of polyethylene glycol having an average molecular weight of 5,000, 3.88 parts of dimethyl terephthalate and 0.1 part of a 10% aqueous solution of flaky potassium hydroxide and the temperature was increased to 200° C. under a vacuum of 1 torr. The reaction was conducted under the above conditions for 3 hours, with the byproduct methanol being continuously removed to give a high-molecular compound.

As determined by high performance liquid chromatography, this high-molecular compound had an average molecular weight of about 100,000.

One hundred parts of the above high-molecular compound and 100 parts of granular acetylene black (electrically conductive filler) were kneaded together on a roll mill maintained at 80° C. to give a blend.

Twenty parts of said blend was mixed with 100 parts of low-density polyethylene and the mixture was molded into a sheet, 1.0 mm thick, using an extrusion molding machine set to a cylinder temperature of 170° C. and a T-die temperature of 170° C.

The sheet was measured for friction-generated charge (Kyoto University Institute for Chemical Research type rotary static tester) and surface resistivity (Toa Dempa Kogyo ultra-insulation resistance meter SM-10E) at 20° C. and 60% RH.

The results are set forth in Table 1.

The surface resistivity values in the table are the values found immediately after molding, after one month of standing and after 30 minutes of heating at 80° C.

EXAMPLE 2

A mixture consisting of 2 parts of the high-molecular compound obtained in Example 1, 8 parts of granular acetylene black and 100 parts of polypropylene was molded into a sheet, 1.0 mm thick, using an extrusion molding machine set to a cylinder temperature of 180° C. and a T-die temperature of 190° C. The sheet was measured for the same parameters in the same manner as Example 1. The results are set forth in Table 1.

EXAMPLE 3

A mixture composed of 2 parts of a high-molecular compound (average molecular weight 200,000) obtained by reacting polyethylene glycol having an average molecular weight of 1,000 with 4,4'-methylenebis(phenyl isocyanate) in an NCO/OH equivalent ratio of 1.0, 5 parts of powdery nickel, 100 parts of polyvinyl chloride, 50 parts of a plasticizer (dioctyl phthalate) and 2 parts of calcium stearate was molded into a sheet in the same manner as Example 1. The sheet was measured for the same parameters in the same manner as Example 1. The results are set forth in Table 1.

EXAMPLE 4

A mixture composed of 3 parts of a high-molecular compound (average molecular weight 80,000) obtained from bisphenol A-ethylene oxide adduct (average molecular weight 3,000) and hexamethylene diisocyanate in an NCO/OH equivalent ratio of 1.0, 10 parts of finely pulverized cupric oxide and 100 parts of acrylonitrile-butadiene-styrene terpolymer was extrusion-molded into a sheet, 1.0 mm thick, at a cylinder temperature of 195° C. and a T-die temperature of 200° C. as in Example 1. The results are set forth in Table 1.

COMPARATIVE EXAMPLES 1-4

Resin sheets which contained neither the high-molecular compound nor the electrically conductive filler were measured for the same parameters as mentioned above. The results are also shown in Table 1.

TABLE 1

| Characteristics Sample | Friction-generated charge (V) | | Surface resistivity ($\Omega$.cm) | | | Molded product Appearance |
|---|---|---|---|---|---|---|
| | After 30 seconds | After 1 minute | Immediately after molding | After 1 month | After heat treatment | |
| Example 1 | 8 | 10 | $1.0 \times 10^8$ | $1.5 \times 10^8$ | $1.5 \times 10^8$ | Good |
| Comparative Example 1 | 700 | 500 | $1.9 \times 10^{14}<$ | $1.9 \times 10^{14}<$ | $1.9 \times 10^{14}<$ | Good |
| Example 2 | 40 | 25 | $1.5 \times 10^9$ | $1.8 \times 10^9$ | $1.8 \times 10^9$ | Good |
| Comparative Example 2 | 2000 | 1800 | $1.0 \times 10^{14}<$ | $1.0 \times 10^{14}<$ | $1.0 \times 10^{14}<$ | Good |
| Example 3 | 100 | 90 | $8.0 \times 10^9$ | $6.0 \times 10^9$ | $9.0 \times 10^9$ | Good |
| Comparative Example 3 | 2425 | 3200 | $1.9 \times 10^{14}<$ | $1.9 \times 10^{14}<$ | $1.9 \times 10^{14}<$ | Good |
| Example 4 | 20 | 30 | $4.0 \times 10^8$ | $3.5 \times 10^8$ | $5.5 \times 10^8$ | Good |
| Comparative Example 4 | 1540 | 1825 | $1.9 \times 10^{14}<$ | $1.9 \times 10^{14}<$ | $1.9 \times 10^{14}<$ | Good |

What is claimed is:

1. An antistatic and ionically conductive resin composition which comprises:
   (A) 100 parts by weight of a resin,
   (B) 0.1 to 70 parts by weight of a high-molecular compound having an average molecular weight of not less than 10,000 prepared by reacting a polyoxyalkylene glycol having an average molecular weight of not less than 100 and the alkylene of which has 2-4 C atoms with at least one member selected from the group consisting of polycarboxylic acid, polycarboxylic acid lower alkyl ester, polycarboxylic acid anhydride or organic polyisocyanate, the polycarboxylic acid being malonic acid, succinic acid, maleic acid, fumaric acid, adipic acid, sebacic acid, phthalic acid, isophthalic acid, terephthalic acid, itaconic acid, trimellitic acid or pyromellitic acid, the ester being monomethyl ester, dimethyl ester, monoethyl ester, diethyl ester, monopropyl ester, dipropyl ester, monobutyl ester or dibutyl ester, the organic polyisocyanate being tolylene diisocyanate, 4,4'-methylenebis(phenyl isocyanate), hexamethylene diisocyanate, isophorone diisocyanate, xylylene diisocyanate, 4,4'-methylenebis(cyclohexyl isocyanate), 4,4'-isopropylidenebis(cyclohexyl isocyanate) or trimethylhexamethylene diisocyanate and
   (C) 0.1 to 30 parts by weight of an electrically conductive filler.

2. A composition according to claim 1, in which the proportion of the electrically conductive filler is 0.5 to 20 parts by weight.

3. A composition according to claim 1, in which the average molecular weight of the high-molecular compound is not less than about 80,000.

4. A composition according to claim 2, in which the average molecular weight of the high-molecular compound is not less than about 80,000.

5. A composition according to claim 3, in which the average molecular weight of the high-molecular compound is as high as 200,000.

6. A composition according to claim 4, in which the average molecular weight of the high-molecular compound is as high as 200,000.

* * * * *